(12) United States Patent
Erb et al.

(10) Patent No.: US 8,409,387 B2
(45) Date of Patent: Apr. 2, 2013

(54) PROCESS FOR PRODUCING COMPONENTS

(75) Inventors: Thiemo Adolf Erb, Stuttgart (DE); Norbet Schwan, Rutesheim (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 210 days.

(21) Appl. No.: 12/949,007

(22) Filed: Nov. 18, 2010

(65) Prior Publication Data

US 2011/0114253 A1 May 19, 2011

(30) Foreign Application Priority Data

Nov. 19, 2009 (DE) .......................... 10 2009 053 947

(51) Int. Cl.
  *B29C 70/52* (2006.01)
  *B29C 65/76* (2006.01)

(52) U.S. Cl. ....................................... 156/166; 156/289

(58) Field of Classification Search .................. 156/166, 156/180, 289
  See application file for complete search history.

(56) References Cited

U.S. PATENT DOCUMENTS

| | | | |
|---|---|---|---|
| 3,689,343 A | 9/1972 | Elsner | |
| 6,746,747 B2 | 6/2004 | Davies et al. | |
| 7,807,005 B2 * | 10/2010 | Rubin et al. | 156/200 |
| 2002/0014302 A1 * | 2/2002 | Fanucci et al. | 156/179 |
| 2004/0211151 A1 | 10/2004 | Fanucci | |

FOREIGN PATENT DOCUMENTS

| | | |
|---|---|---|
| DE | 1 779 336 | 8/1972 |
| DE | 197 54 381 | 6/1999 |
| DE | 602 21 469 | 5/2008 |

* cited by examiner

*Primary Examiner* — Michael Tolin
(74) *Attorney, Agent, or Firm* — Gerald E. Hespos; Michael J. Porco; Matthew T. Hespos

(57) ABSTRACT

A process for producing hollow fiber-reinforced components includes impregnating fibers with an impregnating material, preorienting the impregnated fibers, passing the pre-oriented fibers through a heated extrusion die to cure the impregnating material and to form a hollow profile and detaching segments from the hollow profile. The process further includes placing a separating film between the impregnated fibers at one position of the hollow profile prior to curing. The separating film prevents the fibers from bonding as the impregnating material is cured. A segment produced in this way is swung open at the position of the separating film. A subassembly is positioned inside the swung-open segment and then adjacent portions of the segment are permanently bonded together.

8 Claims, 3 Drawing Sheets

PROCESS FOR PRODUCING COMPONENTS

CROSS-REFERENCE TO RELATED APPLICATION

This application claims priority under 35 USC 119 to German Patent Application No. 10 2009 053 947.6 filed on Nov. 19, 2009, the entire disclosure of which is incorporated herein by reference.

BACKGROUND OF THE INVENTION

1. Field of the Invention

The invention relates to a process for producing components by extrusion.

2. Description of the Related Art

Extrusion processes are known for producing fiber-reinforced components and often are referred to as pultrusion processes. The prior art process for extruding a fiber-reinforced components is shown schematically in FIG. 1. With reference to FIG. 1 the prior art process includes a first step 10 in which fibers 12, such as glass or carbon fibers, are drawn from reels 11. The prior art process then includes an impregnating step 13 in which the fibers 12 are impregnated with an impregnating material 14, such as resin, to produce impregnated fibers 15. The prior art process then includes a preorienting step 16 where the impregnated fibers 15 are pre-oriented in a preforming mold 17 where the impregnated fibers 15. The prior art process then includes and extrusion step 18 where the impregnated fibers 15 are formed and cured with the aid of a heated extrusion die 19. The heated extrusion die 19 shown in FIG. 1, has a first zone, in which a temperature T1 prevails, and a second zone, in which a temperature T2 prevails. The impregnated and pre-oriented fibers are formed finally in the first zone, in which the temperature T1 prevails and are cured in the second zone, in which the temperature T2 prevails. The prior art process then includes a pulling step 20 in which the profiled part 21 that emerges from the heated extrusion die 19 is pulled with the aid of a pulling device 22 through the processing stations of the method steps 10, 13, 16 and 18. The prior art process ends with a cutting step 24 in which the profiled part 21 is fed to a cutting tool 23 to detach segments 25 from the extruded profile 21 by cutting.

The extrusion die 19 that finally forms and cures the preformed fibers has at least an outer mold that determines an outer contour of a profile to be extruded. The extrusion die 19 also has a core mold if a hollow profile is to be produced by extrusion. The core mold determines an inner contour of the hollow profile to be extruded. Accordingly, the prior art extrusion process is known to produce hollow profiles or hollow components.

Efforts to use extrusion to produce hollow components that are intended to position further subassemblies in the hollow space have presented difficulties.

Accordingly, an object of the invention is to provide a novel process for producing components by the extrusion processes.

SUMMARY OF THE INVENTION

The invention relates to an extrusion forming process where, at least during the final forming, a separating film is placed between the impregnated fibers or is drawn between the impregnated fibers at a position of the hollow profile to be extruded in the direction of extrusion of the hollow profile. The separating film at this position prevents the fibers from bonding by means of the impregnating material that is to be cured. A segment detached from the hollow profile produced in this way for producing a component is swung open at this position. The separating film then is removed and at least one subassembly then is positioned in the hollow space inside the swung-open segment. Adjacent portions of the segment subsequently are bonded permanently together at this position. The term fibers should be understood here as also meaning fibrous preforms such as woven or laid fabrics, scrims or the like.

The invention enables a simple extrusion process to be used even for producing hollow components in which it is intended to position at least one subassembly in the hollow space after the extrusion.

The separating film preferably is placed between the impregnated fibers or is drawn between the impregnated fibers at a position of the hollow profile to be extruded during the pre-orientation and final forming steps. The drawing in of the separating film at the early stage of pre-orienting the fibers has advantages from technical aspects of the process.

The process of the invention preferably employs an extrusion die with an outer mold comprising at least two parts used during the final forming of the pre-oriented fibers and during curing of the impregnating material. The separating film is drawn in at one position between the impregnated fibers and between the two adjacent parts of the outer mold. The outer mold with at least two parts is used during the extrusion and enables production of complexly contoured hollow profile segments that can be swung open.

An exemplary embodiment of the invention is explained in more detail with reference to the drawings, without the invention being restricted to this embodiment.

DETAILED DESCRIPTION OF THE PREFERRED EMBODIMENT

The invention relates to a process for producing fiber-reinforced hollow components by an extrusion process. The extrusion processes of the invention also are referred to as pultrusion processes. Parts of the inventive extrusion conform to the prior art extrusion process illustrated in FIG. 1 and described above. However, the invention provides a further development of the known extrusion process and allows extrusion to be used for producing hollow components in which at least one further subassembly is positioned in the hollow space after the extrusion.

Figure 1:
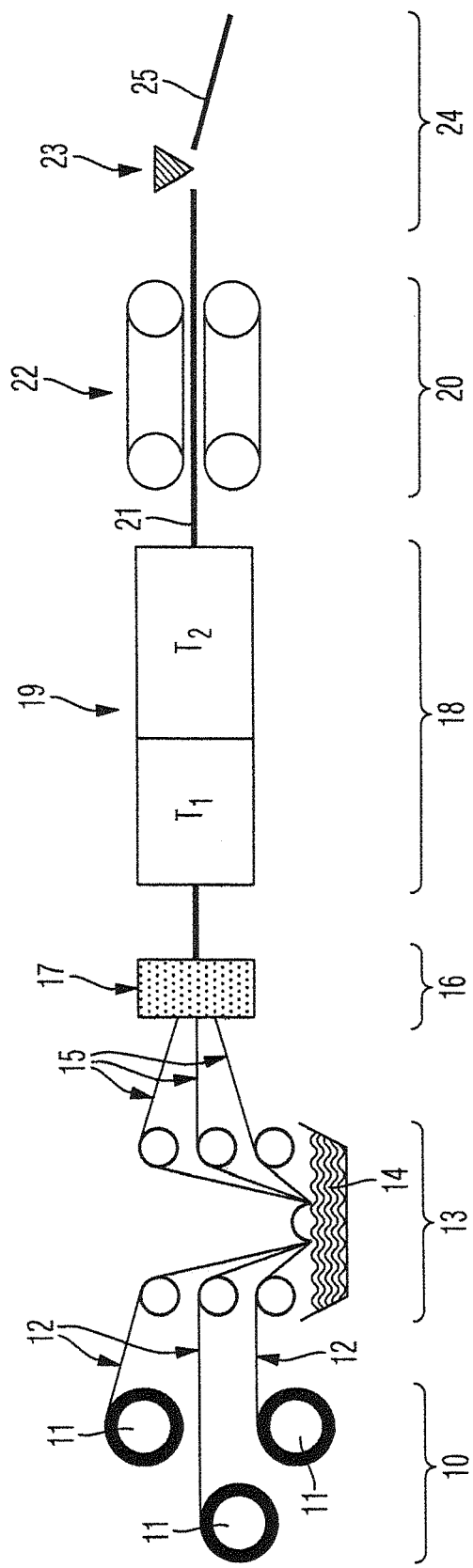
FIG. 1 shows the procedure known from the prior art for producing fiber-reinforced components by AN extrusion process.

The process of the invention differs from the prior art process of FIG. 1 at least during step 18 of FIG. 1, which relates to the final forming of the hollow profile that is to be extruded. More particularly, the process of the invention includes at least an additional step of placing or drawing a separating film between the impregnated fibers of the hollow profile. The separating film extends in the direction of extrusion and prevents the fibers at this position from being bonded by the impregnating material that is to be cured.

In an alternate process the separating film can be drawn into the pre-impregnated fibers during pre-orientation at step 16. This alternate process also prevents the fibers from bonding at the defined position of the hollow profile to be extruded during final forming and curing in step 18.

Figure 2:
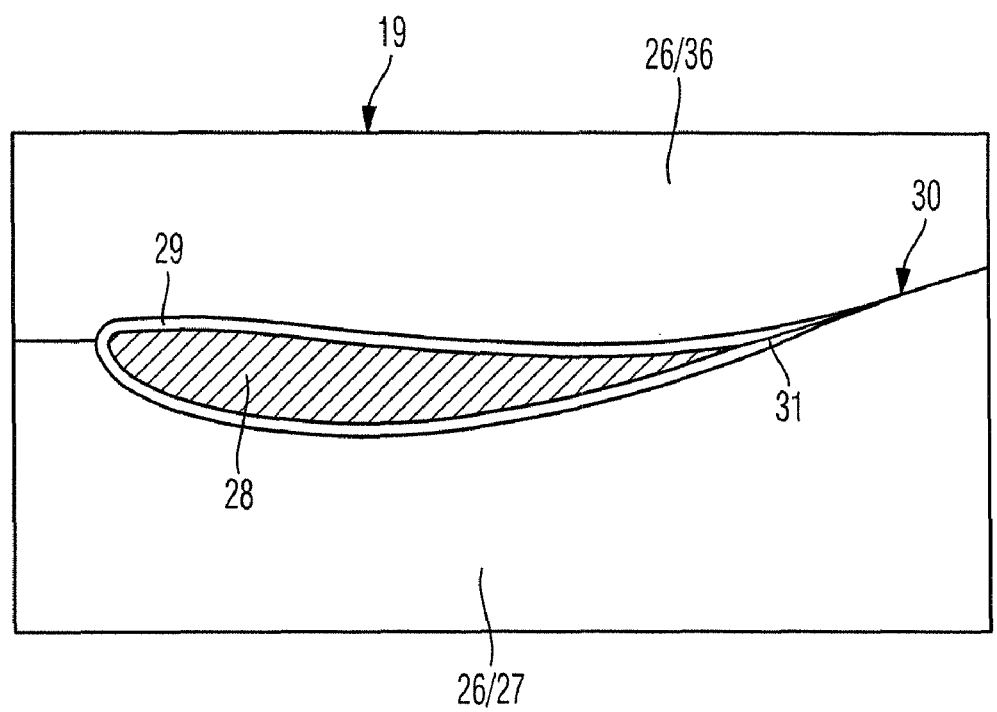
FIG. 2 is a schematized representation of an extrusion die that can be used in the process of the invention.

The separating film that is drawn between the impregnated fibers during final forming and curing is particularly advantageous with the extrusion die 19 of FIG. 2. More particularly, the extrusion die 19 of FIG. 2 has an outer mold 26 with at least two parts that determine the outer contour of a hollow profile to be extruded.

The outer mold 26 of the extrusion die 19 of FIG. 2 has a lower part 27 and an upper part 36 and is used in step 18 of the extrusion process for the final forming of the impregnated and pre-oriented fibers and the curing of the impregnating material. Thus, the outer mold 26 determines the outer contour of the hollow profile that is to be extruded. The extrusion die 19 of FIG. 2 also has a core mold 28 positioned in the outer mold 26 of the extrusion die 19. The core mold 28 determines the inner contour of the hollow profile to be extruded. A hollow space 29 is formed between the core mold 28 and the outer mold 26, and the pre-formed impregnated fibers are finally formed and cured in the hollow space 29 to define the specified hollow profile.

The separating film 31 is drawn between the fibers at the position 30 in FIG. 2 between the lower part 27 and the adjacent upper part 36 of the outer mold 26. The separating film 31 prevents the fibers from being bonded together at the position 30 during the final forming of the fibers and curing of their impregnating material.

Figure 3:
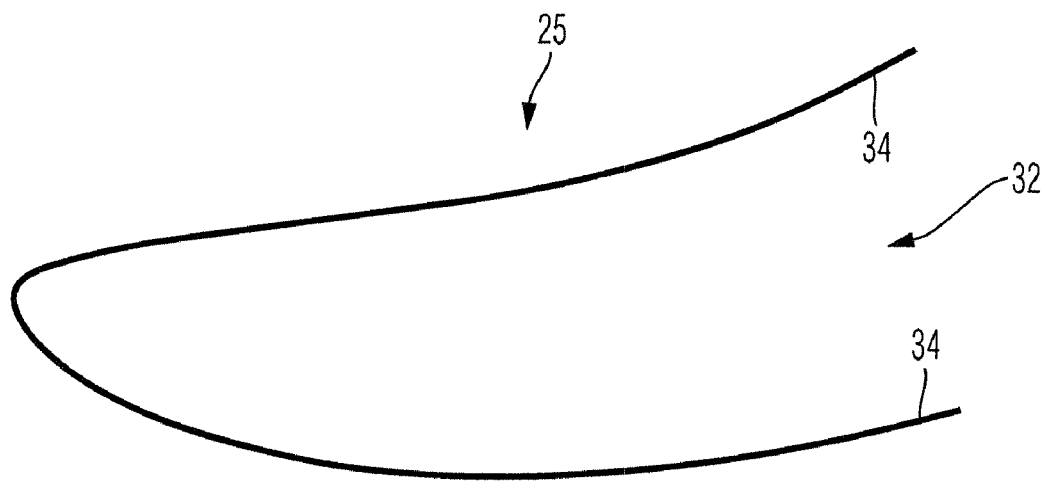
FIG. 3 shows a schematized representation of a swung-open segment produced by the process of the invention.
Figure 4:
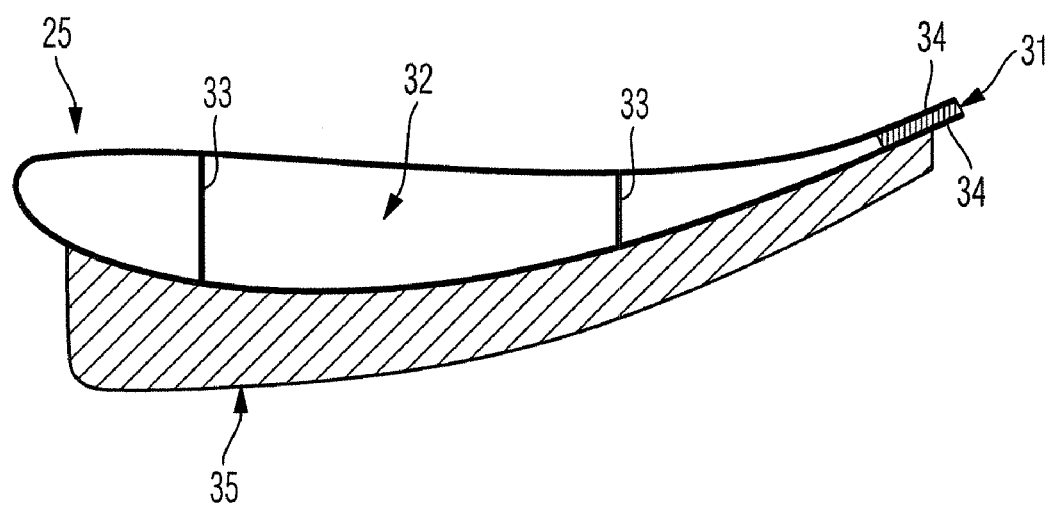
FIG. 4 is a schematized representation of a component produced by the process of the invention.

The segments 25 are detached from the extruded hollow profile after curing. As shown in FIG. 3, a segment 25 can be swung open at the position of the separating film 31 and the separating film 31 then is removed. At least one subassembly 33 then is positioned in the hollow space 32 of the segment 25, as shown in FIG. 4. The segment 25 then is closed around the subassemblies 33 and permanently bonded, for example by adhesion, to the subassemblies 33 and at the adjacent portionsw 34 that were not bonded during the extrusion due to the presence of the separating film 31.

The separating film 31 preferably is a thermoplastic film, in particular a PE film or a PET film.

In the exemplary embodiment shown, the segment 25 formed during the extrusion process of the invention is an airfoil profile of a motor vehicle spoiler. The subassemblies 33 are supports or struts positioned in the airfoil profile 25 after swinging open the airfoil profile 25. The supports or struts 33 increase the stability of the airfoil profile 25 produced in this way. After the positioning the struts 33 in the hollow space 32 of the airfoil profile 25, the airfoil profile 25 is bonded permanently together by adhesion at the portions 34 that were not bonded together during the extrusion due to the positioning of the separating film 31, fastening elements 35 then subsequently are molded onto the airfoil profile 25 produced in this way to allow the airfoil profile 25 to be attached to a body structure of a motor vehicle.

In accordance with the invention hollow components are produced by extrusion processes or pultrusion processes. At least during final forming of the pre-formed and impregnated fibers, and consequently during or before curing of the impregnating material, a separating film that extends in the direction of extrusion is positioned between the fibers, so that the fibers are not bonded together at this position during the curing of the impregnating material. Thus, a hollow profile is formed and has fibers that are not bonded together at one position. Therefore the hollow profile is not closed all around but has a seam extending in the direction of advancement of the fibers or in the direction of extrusion. Consequently the extruded hollow profile has a separating location. Individual segments are separate from the extruded hollow profile and can be opened along the seam to position at least one further component in the hollow space of the cured segment. Subsequently, the segment is bonded permanently together in the region of the seam, preferably by adhesion.

What is claimed is:

1. A process for producing fiber-reinforced hollow components, comprising:
   impregnating fibers with an impregnating material; preorienting the impregnated fibers;
   passing the pre-oriented fibers through a heated extrusion die for forming a hollow profile;
   placing a separating film between the impregnated fibers at a selected position along the hollow profile in a direction of extrusion;
   curing the impregnated material;
   detaching segments from the hollow profile;
   opening the segments at the separating film;
   removing the separating film;
   placing at least one subassembly in the open segment;
   closing the segment around the subassembly; and
   bonding the segment in a closed condition around the subassembly to form the fiber reinforced component.

2. The process of claim 1, wherein the separating film is placed between the impregnated fibers, or drawn in between the impregnated fibers, at one position of the hollow profile during the pre-orientating step.

3. The process of claim 1, wherein adjacent portions of the segment are permanently bonded together by adhesion.

4. The process of claim 1, wherein the step of passing the preoriented fibers through a heated extrusion die comprises passing the preoriented fibers through an extrusion die with an outer mold comprising at least two parts, the separating film being drawn in at one position between the impregnated fibers and between the two parts of the outer mold.

5. The process of claim 1, wherein separating film is a thermoplastic film.

6. The process of claim 5, wherein the separating film is a PE film or PET film.

7. The process of claim 1, wherein the at least one subassembly is at least one strut positioned in the open segment.

8. A process for producing fiber-reinforced hollow airfoil profile for a motor vehicle, comprising:
   impregnating fibers with an impregnating material; preorienting the impregnated fibers;
   passing the pre-oriented fibers through an extrusion die for forming a hollow profile with an outer shape of the airfoil profile;
   placing a separating film between the impregnated fibers at a selected position along the hollow profile in a direction of extrusion;
   curing the impregnated material;
   cutting a section from the hollow profile to form an airfoil profoil segment;
   opening the airfoil profile segments at the separating film;
   removing the separating film;
   placing at least one internal support in the open airfoil profile segment;
   closing the airfoil profile segment around the support; and
   bonding the airfoil profile segment in a closed condition around the support to form the fiber reinforced airfoil profile.

* * * * *